United States Patent
Yui et al.

(10) Patent No.: US 10,006,381 B2
(45) Date of Patent: Jun. 26, 2018

(54) DIAGNOSTIC SYSTEM AND DIAGNOSTIC METHOD FOR INTERNAL COMBUSTION ENGINE

(71) Applicant: Toyota Jidosha Kabushiki Kaisha, Toyota-shi, Aichi-ken (JP)

(72) Inventors: Takashi Yui, Miyoshi (JP); Kota Hayashi, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 61 days.

(21) Appl. No.: 14/332,870

(22) Filed: Jul. 16, 2014

(65) Prior Publication Data

US 2015/0039209 A1 Feb. 5, 2015

(30) Foreign Application Priority Data

Jul. 30, 2013 (JP) .................. 2013-157811

(51) Int. Cl.
| | |
|---|---|
| F02D 41/00 | (2006.01) |
| F02D 41/22 | (2006.01) |
| F02D 13/02 | (2006.01) |
| F02D 41/02 | (2006.01) |
| F02D 41/08 | (2006.01) |
| F02D 41/18 | (2006.01) |

(52) U.S. Cl.
CPC ...... F02D 41/0002 (2013.01); F02D 13/0211 (2013.01); F02D 41/221 (2013.01); F02D 41/0255 (2013.01); F02D 41/08 (2013.01); *F02D 41/18* (2013.01); *F02D 2041/001* (2013.01); *Y02T 10/18* (2013.01); *Y02T 10/42* (2013.01)

(58) Field of Classification Search
CPC ............... F02D 41/18; F02D 2041/001; F02D 41/0002; F02D 41/1454; F02D 41/221; F02D 2200/0404; F02D 2200/0406; F02D 41/222; F02D 41/22; F02D 41/2454; F02D 2041/002; F02D 13/0211; Y02T 10/42; Y02T 10/18
See application file for complete search history.

(56) References Cited

U.S. PATENT DOCUMENTS

| | | | | |
|---|---|---|---|---|
| 5,644,073 | A | * 7/1997 | Matsuno | ........... F01L 1/34 123/90.15 |
| 2005/0081513 | A1* | 4/2005 | Katayama | ........... F01N 11/00 60/284 |
| 2005/0204805 | A1* | 9/2005 | Wakahara | ........... F01L 1/34 73/114.72 |

(Continued)

FOREIGN PATENT DOCUMENTS

| | | |
|---|---|---|
| JP | 2003-138960 A | 5/2003 |
| JP | 2003-201906 A | 7/2003 |

(Continued)

*Primary Examiner* — Sizo Vilakazi
(74) *Attorney, Agent, or Firm* — Dinsmore & Shohl LLP

(57) ABSTRACT

An internal combustion engine includes a variable mechanism that changes a working angle of an intake valve. A controller diagnoses whether there is an abnormality that an intake air amount reduces during idle operation. The controller changes an abnormality determination threshold for diagnosing an abnormality on the basis of a mode in which the working angle is changed by the variable mechanism.

16 Claims, 6 Drawing Sheets

(56) References Cited

U.S. PATENT DOCUMENTS

| | | | |
|---|---|---|---|
| 2007/0225892 A1* | 9/2007 | Yasui | F02B 75/048 |
| | | | 701/104 |
| 2008/0097683 A1* | 4/2008 | Yasui | F02D 13/0207 |
| | | | 701/104 |
| 2008/0167785 A1* | 7/2008 | Miyakoshi | F02D 13/0223 |
| | | | 701/102 |
| 2013/0133401 A1* | 5/2013 | Yui | G01M 15/042 |
| | | | 73/23.32 |
| 2014/0025276 A1* | 1/2014 | Ryu | F02D 41/00 |
| | | | 701/102 |

FOREIGN PATENT DOCUMENTS

| | | |
|---|---|---|
| JP | 2005-120933 A | 5/2005 |
| JP | 2005-315161 A | 11/2005 |
| JP | 2008-291748 A | 12/2008 |
| JP | 2011-099399 A | 5/2011 |

* cited by examiner

DIAGNOSTIC SYSTEM AND DIAGNOSTIC METHOD FOR INTERNAL COMBUSTION ENGINE

INCORPORATION BY REFERENCE

The disclosure of Japanese Patent Application No. 2013-157811 filed on Jul. 30, 2013 including the specification, drawings and abstract is incorporated herein by reference in its entirety.

BACKGROUND OF THE INVENTION

1. Field of the Invention

The invention relates to a diagnostic system and diagnostic method for an internal combustion engine including a variable mechanism that changes a working angle of an intake valve.

2. Description of Related Art

In recent years, an internal combustion engine that is mounted on a vehicle executes catalyst early warm-up control for raising an exhaust gas temperature by retarding ignition timing and increasing an intake air amount as compared to that during normal idle operation in order to suppress a decrease in idle rotation speed due to the retardation of the ignition timing at a cold start. An increase or reduction in the intake air amount is a cause of a change in the amount of heat that is supplied to the catalyst, and an early warm-up of the catalyst cannot be achieved when the intake air amount is small. Therefore, a diagnostic system described in Japanese Patent Application Publication No. 2003-201906 (JP 2003-201906 A) diagnoses an abnormality when an accumulated value of the intake air amount during execution of catalyst early warm-up control is smaller than or equal to a predetermined determination value.

There is an internal combustion engine including a variable mechanism that changes the working angle of the intake valve. In such the internal combustion engine, the flow rate of air that is taken into a cylinder is raised by narrowing the working angle of the intake valve, thus making it possible to facilitate mixing of fuel and air. When mixing of fuel and air is facilitated by narrowing the working angle of the intake valve, combustion takes place in a desired manner, so a misfire is hard to occur even when the ignition timing is retarded. Therefore, in an internal combustion engine including a variable mechanism that changes the working angle of an intake valve, catalyst early warm-up control may be executed in a state where the working angle of the intake valve is narrowed.

SUMMARY OF THE INVENTION

When the working angle is changed, the intake air amount required to keep an idle rotation speed also changes. In the diagnostic system described in JP 2003-201906 A, a change in the required intake air amount, resulting from such a change in the working angle, is not taken into consideration. Thus, there is a concern that combining the technique described in JP 2003-201906 A with the internal combustion engine including the above-described variable mechanism cannot correctly diagnose an abnormality that the intake air amount reduces.

The invention provides a diagnostic system and a diagnostic method for an internal combustion engine including a variable mechanism that changes a working angle of an intake valve, which are able to diagnose an abnormality that an intake air amount reduces, even when the working angle of the intake valve is changed.

A first aspect of the invention provides a diagnostic system for an internal combustion engine including a variable mechanism that changes a working angle of an intake valve. The diagnostic system includes a controller configured to diagnose an abnormality that an intake air amount reduces, when an index value of the intake air amount becomes smaller than an abnormality determination threshold during idle operation, and change the abnormality determination threshold on the basis of a mode in which the working angle is changed by the variable mechanism.

The intake air amount required to keep the engine rotation speed at the idle rotation speed changes in response to the mode in which the working angle is changed by the variable mechanism. In terms of this point, according to the above aspect, the abnormality determination threshold for diagnosing an abnormality that the intake air amount reduces is changed in response to a change in the required intake air amount. Therefore, even when the working angle of the intake valve is changed in the internal combustion engine including the variable mechanism that changes the working angle of the intake valve, it is possible to diagnose an abnormality that the intake air amount reduces.

In the above aspect, changing the abnormality determination threshold on the basis of the mode in which the working angle is changed by the variable mechanism includes the case where the abnormality determination threshold is changed depending on whether the working angle is changed or not changed by the variable mechanism, the case where the abnormality determination threshold is changed when the amount of the working angle that is changed by the variable mechanism is different, and the like.

In the above aspect, an accumulated value of the intake air amount may be employed as the index value of the intake air amount, which changes with the intake air amount, and the controller may be configured to diagnose an abnormality that the intake air amount reduces, when an accumulated value of the intake air amount is smaller than the abnormality determination threshold.

In the above aspect, when the diagnostic system employs the mode in which the controller is configured to diagnose an abnormality when the accumulated value of the intake air amount is smaller than the abnormality determination threshold, the controller may be configured to reduce the abnormality determination threshold when the working angle of the intake valve is narrowed by the variable mechanism as compared to when the working angle is not narrowed.

When the working angle of the intake valve is narrowed by the variable mechanism, it is possible to facilitate mixing of fuel and air by raising the flow rate of air that is taken into a cylinder as compared to when the working angle is not narrowed. Therefore, combustion takes place in a desired manner, a torque that is generated through the combustion increases, and the intake air amount required to keep an idle rotation speed reduces.

According to the above aspect, when the intake air amount required to keep an idle rotation speed is reduced by narrowing the working angle, the abnormality determination threshold is reduced as compared to when the working angle is not narrowed and the required intake air amount is large. Therefore, it is possible to appropriately set the abnormality determination threshold in response to a change in the required intake air amount that increases or reduces in association with a change in the working angle. Therefore, it is possible to appropriately diagnose an abnormality that the intake air amount reduces, on the basis of the working angle.

In the above aspect, when the diagnostic system employs the mode in which the controller is configured to diagnose an abnormality when the accumulated value of the intake air amount is smaller than the abnormality determination threshold, the controller may be configured to reduce the abnormality determination threshold as the working angle of the intake valve is narrowed by the variable mechanism.

As the working angle is narrowed by the variable mechanism, mixing of fuel and air is facilitated, and combustion takes place in a desired manner, so a torque that is generated through the combustion increases. Therefore, the intake air amount required to keep the idle rotation speed reduces.

According to the above aspect, as the required intake air amount reduces as a result of narrowing the working angle, the abnormality determination threshold is reduced. Therefore, it is possible to appropriately set the abnormality determination threshold in association with a change in the required intake air amount that increases or reduces with a change in the amount of working angle. Therefore, it is possible to appropriately diagnose an abnormality that the intake air amount reduces, on the basis of the working angle.

In the above aspect, the controller may be configured to diagnose whether there is an abnormality that the intake air amount reduces, when catalyst early warm-up control for retarding ignition timing and controlling an opening degree of a throttle valve such that an idle rotation speed is kept is being executed.

When the working angle is narrowed by the variable mechanism, mixing of fuel and air is facilitated, and combustion takes place in a desired manner, so a misfire is hard to occur even when the ignition timing is retarded. Therefore, when the working angle is narrowed by the variable mechanism during execution of the catalyst early warm-up control, it is possible to raise an exhaust gas temperature by further retarding the ignition timing without causing a misfire. When the ignition timing is retarded in this way, the intake air amount is increased by increasing the opening degree of the throttle valve in order to suppress a decrease in idle rotation speed due to a decrease in torque caused by the retardation of the ignition timing.

On the other hand, when the working angle is not narrowed during execution of catalyst early warm-up control, the action of facilitating mixing of fuel and air by narrowing the working angle is not obtained. Therefore, in order to suppress a misfire, the ignition timing needs to be more advanced than that when the working angle is narrowed. In this case, in order to suppress a rise in idle rotation speed due to advance of the ignition timing, the intake air amount needs to be reduced by reducing the opening degree of the throttle valve.

Thus, while catalyst early warm-up control is being executed, a change in the required intake air amount is particularly remarkable on the basis of the amount of the working angle, which is changed by the variable mechanism. In terms of this point, according to the above aspect, while catalyst early warm-up control is being executed, the abnormality determination threshold is changed on the basis of whether the working angle is changed, so it is possible to appropriately diagnose whether there is an abnormality that the intake air amount reduces.

In the above aspect, the controller may be configured to diagnose whether the variable mechanism is operating, and the controller may be configured to output a diagnosis of an abnormality in an intake system other than the variable mechanism, when the controller has diagnosed an abnormality that the intake air amount reduces while the variable mechanism is not operating.

While the variable mechanism is not operating, it is diagnosed whether there is an abnormality that the intake air amount reduces by using the abnormality determination threshold for the case where the working angle is not changed by the variable mechanism. That is, in this case, it is diagnosed previously in consideration of the fact that the variable mechanism is not operating. Therefore, when an abnormality that the intake air amount reduces has been diagnosed through this diagnosis, there is another factor in addition to the fact that the variable mechanism is not operating. According to the above aspect, while the variable mechanism is not operating, it is diagnosed whether there is an abnormality that the intake air amount reduces on the basis of the abnormality determination threshold for the case where the working angle is not changed. When an abnormality that the intake air amount reduces has been diagnosed, a diagnosis of an abnormality in the intake system other than the variable mechanism is output. Thus, it is possible to diagnose an abnormality in the intake system other than the variable mechanism.

A second aspect of the invention provides a diagnostic method for an internal combustion engine including a controller and a variable mechanism that changes a working angle of an intake valve. The diagnostic method comprises diagnosing, by the controller, an abnormality that an intake air amount reduces when an index value of the intake air amount becomes smaller than an abnormality determination threshold during idle operation and changing, by the controller, the abnormality determination threshold on the basis of a mode in which the working angle is changed by the variable mechanism.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a first embodiment of a diagnostic system for an internal combustion engine will be described with reference to FIG. 1 to FIG. 5.

Figure 1:
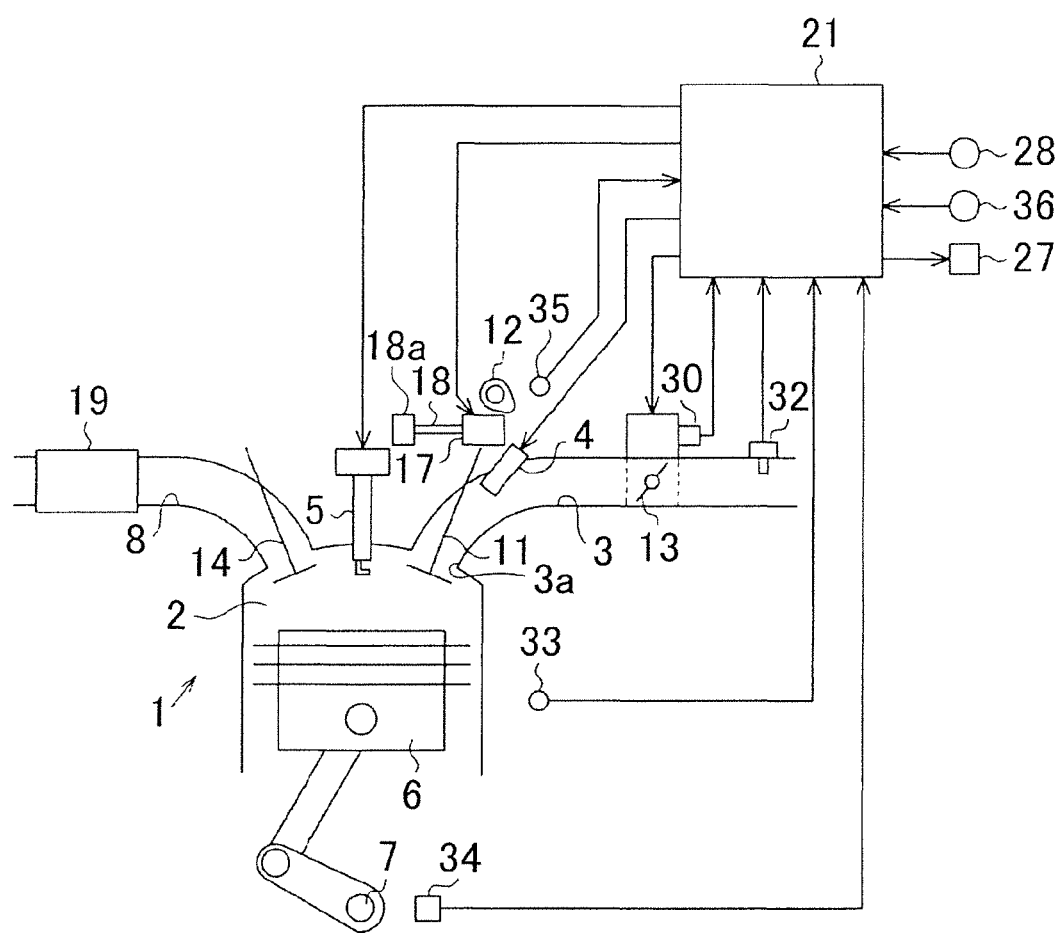
FIG. 1 is a schematic view that shows an internal combustion engine, to which a diagnostic system for an internal combustion engine according to a first embodiment is applied, and its peripheral mechanism.

As shown in FIG. 1, in an internal combustion engine 1, a throttle valve 13 is provided in an intake passage 3 so as to be able to open or close. The intake passage 3 communicates with a combustion chamber 2. Air is taken into the combustion chamber 2 through the intake passage 3, and fuel injected from a fuel injection valve 4 toward an intake port 3a of the internal combustion engine 1 is supplied to the combustion chamber 2. When the air-fuel mixture formed of air and fuel is ignited by an ignition plug 5, the air-fuel mixture combusts, a piston 6 reciprocally moves, and a crankshaft 7 coupled to the piston 6 rotates. The air-fuel mixture that has combusted in the combustion chamber 2 is delivered to an exhaust passage 8 as exhaust gas.

The combustion chamber 2 and the intake passage 3 in the internal combustion engine 1 are communicated with or interrupted from each other by the open/close operation of an intake valve 11. On the other hand, the combustion chamber 2 and the exhaust passage 8 in the internal combustion engine 1 are communicated with or interrupted from each other by the open/close operation of an exhaust valve 14.

Figure 2:
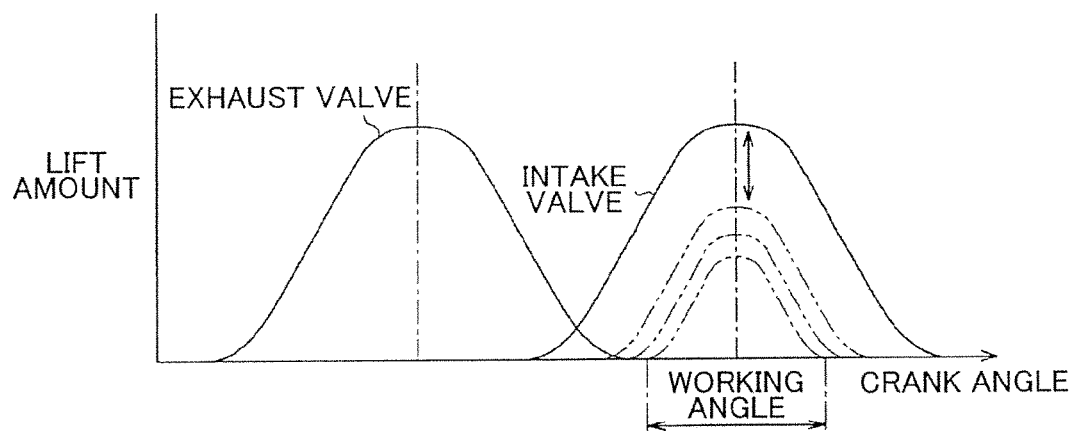
FIG. 2 is a graph that shows a change in the lift amount of an exhaust valve and a change in the lift amount of an intake valve to a change in crank angle in the internal combustion engine.

The internal combustion engine 1 includes a variable mechanism 17 that changes the working angle and maximum lift amount of the intake valve 11. The working angle is the open/close period of the intake valve 11. The variable mechanism 17 is interposed between the intake valve 11 and an intake cam 12. The variable mechanism 17 changes the working angle and maximum lift amount of the intake valve 11 in synchronization with each other as shown in FIG. 2 by displacing a control shaft 18 in the axial direction through driving of a motor 18a. The control shaft 18 is connected to the variable mechanism 17. When the control shaft 18 is displaced in the axial direction and reaches one limit position (hereinafter, referred to as "low end") of a movable range, a further displacement of the control shaft 18 is restricted by a stopper, the maximum lift amount of the intake valve 11 is minimum, and the working angle of the intake valve 11 is a minimum working angle. On the other hand, when the control shaft 18 is displaced in the axial direction and reaches the other limit position (hereinafter, referred to as "high end") of the movable range, a further displacement of the control shaft 18 is restricted by a stopper, the maximum lift amount of the intake valve 11 is maximum, and the working angle of the intake valve 11 is a maximum working angle. That is, when the control shaft 18 is displaced in the axial direction between the limit positions at both ends of the movable range, the working angle and maximum lift amount of the intake valve 11 each change between the minimum value and the maximum value. Thus, the absolute position of the control shaft 18 in the axial direction correlates with the working angle and maximum lift amount of the intake valve 11.

An exhaust gas purification catalyst 19, such as a three-way catalyst, that purifies exhaust gas is provided in the exhaust passage 8 of the internal combustion engine 1. Various controls over the internal combustion engine 1 are executed by a controller 21. The controller 21 includes a CPU, a ROM, a RAM, an EEPROM, input/output ports, and the like. The CPU executes various arithmetic operations. The ROM stores programs and data required for those controls. The RAM temporarily stores computed results, and the like, of the CPU. The EEPROM is a nonvolatile memory that allows stored data to be rewritable. The input/output ports are used to input or output a signal from or to an external device.

Various switches, sensors, and the like, are connected to the input port of the controller 21. Such sensors include an accelerator position sensor 28, a throttle sensor 30 and an air flow meter 32. The accelerator position sensor 28 detects the depression amount of an accelerator pedal. The throttle sensor 30 detects the opening degree of the throttle valve 13 (throttle opening degree). The air flow meter 32 detects the amount of air that passes through the intake passage 3 (intake air amount). The sensors further include a coolant temperature sensor 33, a crank position sensor 34, a displacement sensor 35, and the like. The coolant temperature sensor 33 detects the coolant temperature of the internal combustion engine 1. The crank position sensor 34 outputs a signal corresponding to the rotation of the crankshaft 7. The displacement sensor 35 detects the displacement of the control shaft 18 connected to the variable mechanism 17. An ignition switch 36 is also connected to the input port of the controller 21. The ignition switch 36 is a start/stop switch for the internal combustion engine 1, and is operated by a driver.

Drive circuits of the fuel injection valve 4, the ignition plug 5, the throttle valve 13, the motor 18a and an information lamp 27, and the like, are connected to the output port of the controller 21. The motor 18a drives the control shaft 18 of the variable mechanism 17. The information lamp 27 informs an abnormality of the internal combustion engine 1.

The controller 21 acquires various engine operating states on the basis of detected values output from the various sensors, and the like. For example, the controller 21 acquires an engine rotation speed on the basis of a detected signal from the crank position sensor 34. The engine rotation speed is the rotation speed of the crankshaft 7. The controller 21 calculates an engine load from the intake air amount of the internal combustion engine 1 and the engine rotation speed obtained on the basis of detected values of the accelerator position sensor 28, throttle sensor 30, air flow meter 32, and the like.

The controller 21 acquires the working angle of the intake valve 11 by calculating the absolute position of the control shaft 18 on the basis of a detected value of the displacement sensor 35. More specifically, the controller 21 stores the absolute position of the control shaft 18 in the EEPROM at an engine stop. The controller 21 sets the absolute position of the control shaft 18, stored at the time of the last engine stop, as an initial value, stores the displacement of the control shaft 18 after an engine start, detected by the displacement sensor 35, in the RAM, and adds the displacement to the initial value. Thus, the controller 21 acquires the current absolute position of the control shaft 18. As described above, in the variable mechanism 17, the absolute position of the control shaft 18 in the axial direction correlates with the working angle of the intake valve 11, so the controller 21 acquires the working angle of the intake valve 11 on the basis of the absolute position of the control shaft 18.

For example, when there occurs a temporary stop of energization of the controller 21 because of an instantaneous interruption, or the like (for example, electric power that is supplied from a battery (not shown) to the controller 21 is temporarily interrupted because of some reasons), the displacement of the control shaft 18, stored in the RAM, can be lost or can change. In such a case, the controller 21 is not able to accurately acquire the absolute position of the control shaft 18, so the controller 21 executes learning control for learning the absolute position of the control shaft 18. When an instantaneous interruption, or the like, has occurred immediately before an engine stop, the absolute position of the control shaft 18 at an engine stop may not be able to be accurately stored in the EEPROM. Thus, when the absolute position is not accurately stored at an engine stop, learning control for learning the absolute position of the control shaft 18 is executed at the next engine start. In this learning control, the controller 21 displaces the control shaft 18 toward the high end, and stores the absolute position of the control shaft 18 contacting the high end-side stopper in the EEPROM as an initial value. By adding the subsequent displacement of the control shaft 18 to the new initial value, the controller 21 acquires the absolute position of the control shaft 18.

The controller 21 outputs command signals to the various drive circuits, connected to the output port, on the basis of the engine operating states acquired by the various sensors, and the like. In this way, fuel injection control, ignition timing control and intake air amount control in the internal combustion engine 1 are executed by the controller 21. The controller 21 controls the variable mechanism 17 on the basis of the engine operating states acquired by the various sensors, and the like, such that the working angle of the intake valve 11 is suitable for the current engine operating states.

In the present embodiment, as one of such controls, the controller 21 executes catalyst early warm-up control for early warming up the exhaust gas purification catalyst 19, provided in the exhaust passage 8, to an activation temperature during cold idle operation of the internal combustion engine 1. The catalyst early warm-up control is started as the idle operation is started after a cold start, and is ended when a predetermined period by which it may be determined that a warm-up of the catalyst has completed has elapsed. In the present embodiment, the controller 21 diagnoses whether there is an abnormality that the intake air amount reduces during catalyst early warm-up control. Hereinafter, catalyst early warm-up control and a diagnosis of whether there is an abnormality in the intake air amount will be described.

In catalyst early warm-up control, the controller 21 warms up the catalyst by raising an exhaust gas temperature through retardation of the ignition timing at which air-fuel mixture is ignited by the ignition plug 5. In the present embodiment, during execution of catalyst early warm-up control, basically, the working angle of the intake valve 11 is controlled by the variable mechanism 17 so as to become the minimum working angle. More specifically, the controller 21 controls the variable mechanism 17 such that the working angle of the intake valve 11 becomes the minimum working angle by driving the control shaft 18 on the basis of the detected value of the displacement sensor 35. The controller 21 retards the ignition timing on the basis of the working angle of the intake valve 11, which is controlled in this way. That is, the controller 21 controls the working angle of the intake valve 11 to the minimum working angle, with the result that it is possible to facilitate mixing of fuel and air by raising the flow rate of intake air flowing through a clearance between the intake valve 11 and the intake port 3a and to significantly retard the ignition timing. Therefore, it is possible to raise the exhaust gas temperature by further retarding the ignition timing without causing a misfire. The controller 21 acquires the engine rotation speed on the basis of the detected signal of the crank position sensor 34, and controls the opening degree of the throttle valve 13 such that the acquired engine rotation speed becomes an idle rotation speed. Here, in order to suppress a decrease in idle rotation speed, caused by a decrease in torque due to retardation of the ignition timing, the intake air amount needs to be increased, so the opening degree of the throttle valve 13 is increased.

Incidentally, the working angle of the intake valve 11 may not be able to be controlled to the minimum working angle by the variable mechanism 17 during catalyst early warm-up control. In such a case, for example, learning control over the absolute position of the control shaft 18 needs to be executed at an engine start. That is, in this learning control, the control shaft 18 is moved to the high end side, so the working angle of the intake valve 11 is controlled so as to be larger than the minimum working angle. When there occurs a break in the motor 18a that drives the control shaft 18 or there occurs inclusion, or the like, of foreign matter in the control shaft 18 or the variable mechanism 17 as well, there is a case where the working angle of the intake valve 11 cannot be controlled by the variable mechanism 17 to the minimum working angle and then the working angle of the intake valve 11 is larger than the minimum working angle. Therefore, in these cases, the action of facilitating mixing of fuel and air by narrowing the working angle of the intake valve 11 is not obtained.

Therefore, in the present embodiment, when the controller 21 cannot control the working angle of the intake valve 11 to the minimum working angle by the variable mechanism 17 during catalyst early warm-up control, the controller 21 advances the ignition timing of the ignition plug 5 to ignition timing at which a misfire does not occur even when the working angle of the intake valve 11 is the maximum working angle. The controller 21 controls the opening degree of the throttle valve 13 such that the engine rotation speed acquired on the basis of the detected signal of the crank position sensor 34 becomes the idle rotation speed. In this case, the intake air amount needs to be reduced in order to suppress a rise in idle rotation speed due to advance of the ignition timing, so the controller 21 reduces the opening degree of the throttle valve 13 as compared to when the working angle of the intake valve 11 is controlled to the minimum working angle.

In this way, during catalyst early warm-up control, the intake air amount required to keep the idle rotation speed also changes on the basis of a mode in which the working angle of the intake valve 11 is changed by the variable mechanism 17. Therefore, when the same value is used as an abnormality determination threshold for determining whether the intake air amount reduces during catalyst early warm-up control irrespective of the mode in which the working angle of the intake valve 11 is changed, there is a concern that it is not possible to correctly diagnose an abnormality that the intake air amount reduces. Therefore, in the present embodiment, the abnormality determination threshold is changed between when the working angle of the intake valve 11 is controlled to the minimum working angle during catalyst early warm-up control and when the working angle is not controlled to the minimum working angle because of learning control or abnormality of the variable mechanism 17. The abnormality determination threshold is set as described below in detail.

Figure 3:
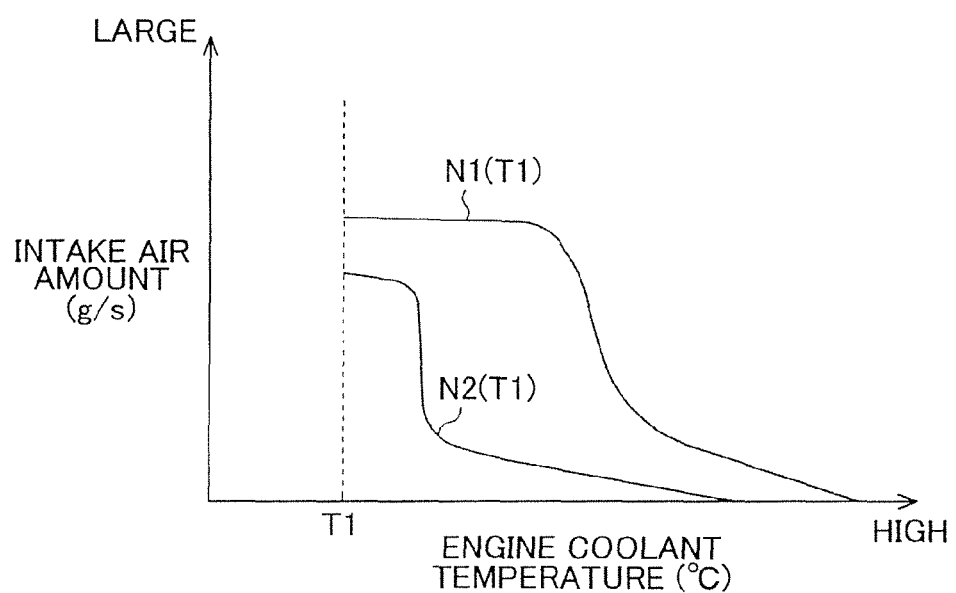
FIG. 3 is a graph that shows an example of an abnormality determination map according to the first embodiment.

As shown in FIG. 3, in the present embodiment, an abnormality determination map that shows an intake air amount required per unit time is stored in the ROM of the controller 21. The intake air amount required during catalyst early warm-up control is calculated on the basis of the map as the abnormality determination threshold. The abnormality determination map is set by deriving a required intake air amount through an experiment, computation, or the like, in advance.

FIG. 3 is an example of the abnormality determination map. In this example, when a shift range is set to a neutral range and an engine coolant temperature is T1 (° C.) at the time when catalyst early warm-up control is started, the intake air amount required per unit time is set on the basis of the engine coolant temperature. In FIG. 3, the continuous line N1 (T1) shows a map of the intake air amount required at the time when the working angle of the intake valve 11 is the minimum working angle. In FIG. 3, the continuous line N2 (T1) shows a map of the intake air amount required at the time when the working angle of the intake valve 11 is set to the maximum working angle. In this way, the ROM of the controller 21 stores the maps of the intake air amount required at the time when the working angle of the intake valve 11 is the maximum working angle and the minimum working angle for each shift range and each coolant temperature at the time of a start of catalyst early warm-up control. That is, the ROM of the controller 21 also stores the map of the intake air amount required at the time when the shift range is set to a drive range, for each coolant temperature at the time of a start of catalyst early warm-up control. The abnormality determination map for the drive range is also set as follows. The intake air amount required at the time when the working angle of the intake valve 11 is set to the minimum working angle is larger than the intake air amount required at the time when the working angle is set to the maximum working angle. In the abnormality determination map, when the working angle is the same and the coolant temperature at the time of a start of catalyst early warm-up control is the same, the required intake air amount is set so as to be larger when the shift range is set to the drive range than when the shift range is set to the neutral range. In the present embodiment, the idle rotation speed during catalyst early warm-up control is set to the same rotation speed between when the shift range is set to the drive range and when the shift range is set to the neutral range, and a load is larger at the drive range even when kept at the same rotation speed, so the required intake air amount increases.

Figure 4:
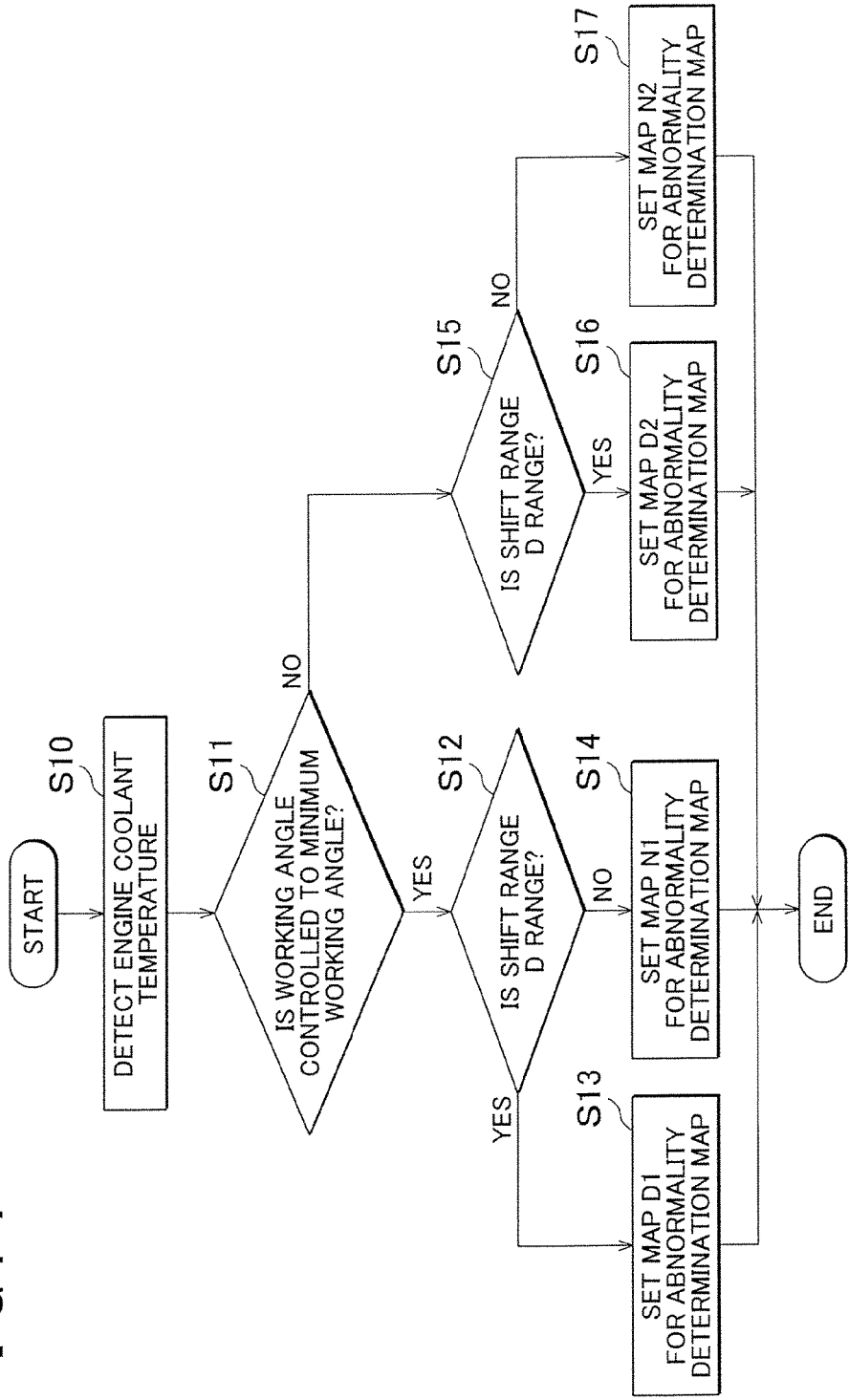
FIG. 4 is a flowchart that shows the procedure of setting the abnormality determination map according to the embodiment.

In the present embodiment, the controller 21 selects the abnormality determination map that is used to diagnose whether there is an abnormality of a reduction in intake air amount in accordance with the procedure shown in the flowchart of FIG. 4. A series of processes shown in FIG. 4 are executed when catalyst early warm-up control is started. The controller 21 recognizes that catalyst early warm-up control has been started on the condition that idle operation has been started when the engine is cold, and starts the process.

When the process shown in FIG. 4 is started, the controller 21 initially detects the engine coolant temperature in step S10 on the basis of information that is input from the coolant temperature sensor 33. That is, in the present embodiment, as described above, because the abnormality determination map for setting the abnormality determination threshold is set for each engine coolant temperature at a start of catalyst early warm-up control, so the coolant temperature at a start of catalyst early warm-up control is detected in order to select the abnormality determination map.

Subsequently, the process proceeds to step S11, and it is determined whether the working angle of the intake valve 11 is controlled to the minimum working angle. When it is determined in step S11 that control for setting the working angle to the minimum working angle is executed by the variable mechanism 17, the process proceeds to step S12.

In step S12, it is determined whether the shift range is set to the drive range. When it is determined in step S12 that the shift range is set to the drive range, the process proceeds to step S13, and a map D1 is selected as the abnormality determination map that is used to diagnose whether there is an abnormality. This map D1 is an abnormality determination map that is set in correspondence with the engine coolant temperature detected in step S10 among the abnormality determination maps when the shift range is the drive range and the working angle of the intake valve 11 is the minimum working angle. When the abnormality determination map that is used to diagnose whether there is an abnormality is selected in this way, the controller 21 once ends the routine. On the other hand, when the shift range is set to the neutral range, negative determination is made in step S12. The process proceeds to step S14, and the map N1 is selected as the abnormality determination map that is used to diagnose whether there is an abnormality. This map N1 is an abnormality determination map that is set in correspondence with the engine coolant temperature detected in step S10 among the abnormality determination maps in the case where the shift range is the neutral range and the working angle of the intake valve 11 is the minimum working angle. When the abnormality determination map that is used to diagnose whether there is an abnormality in this way, the controller 21 once ends the process.

When learning control for learning the absolute position of the control shaft 18 of the variable mechanism 17 is being executed or when there is an abnormality, such as a malfunction of the variable mechanism 17, it is determined in step S11 that the working angle is not controlled to the minimum working angle, and the process proceeds to step S15. Whether learning control is being executed may be determined on the basis of, for example, the fact that the drive signal is output to the motor 18a of the control shaft 18 in order for the controller 21 to execute learning control. Whether there is a malfunction of the variable mechanism 17 may be determined on the basis of, for example, the fact that the displacement that is detected by the displacement sensor 35 is not a value corresponding to the drive signal of the controller 21 although the controller 21 is outputting the drive signal to the motor 18a of the control shaft 18 in order to control the working angle of the intake valve 11 to the minimum working angle.

In step S15, it is determined whether the shift range is set to the drive range. When it is determined in step S15 that the shift range is set to the drive range, the process proceeds to step S16, and a map D2 is set as the abnormality determination map that is used to diagnose whether there is an abnormality. This map D2 is an abnormality determination map that is set in correspondence with the engine coolant temperature detected in step S10 among the abnormality determination maps in the case where the shift range is the drive range and the working angle of the intake valve 11 is the maximum working angle. In this map D2, a required intake air amount is set to a smaller amount than that in the map D1 for the case where the working angle is controlled to the minimum working angle. When the abnormality determination map that is used to diagnose whether there is an abnormality is selected in this way, the controller 21 once ends the process. On the other hand, when the shift range is set to the neutral range, negative determination is made in step S15, the process proceeds to step S17, and the map N2 is selected as the abnormality determination map that is used to diagnose whether there is an abnormality. This map N2 is an abnormality determination map that is set in correspondence with the engine coolant temperature detected in step S10 among the abnormality determination maps in the case where the shift range is the neutral range and the working angle of the intake valve 11 is the maximum working angle. As shown in FIG. 3, in this map N2, a required intake air amount is set to a smaller amount than that in the map N1 for the case where the working angle is controlled to the minimum working angle. When the abnormality determination map that is used to diagnose whether there is an abnormality is selected in this way, the controller 21 once ends the process.

Next, an abnormality diagnosing process of diagnosing whether there is an abnormality that the intake air amount reduces during catalyst early warm-up control will be described on the basis of the abnormality determination map selected in this way. The controller 21 diagnoses whether there is an abnormality that the intake air amount reduces in accordance with the procedure shown in the flowchart of FIG. 5. A series of processes shown in FIG. 5 are executed as interrupt processing at predetermined intervals.

Figure 5:
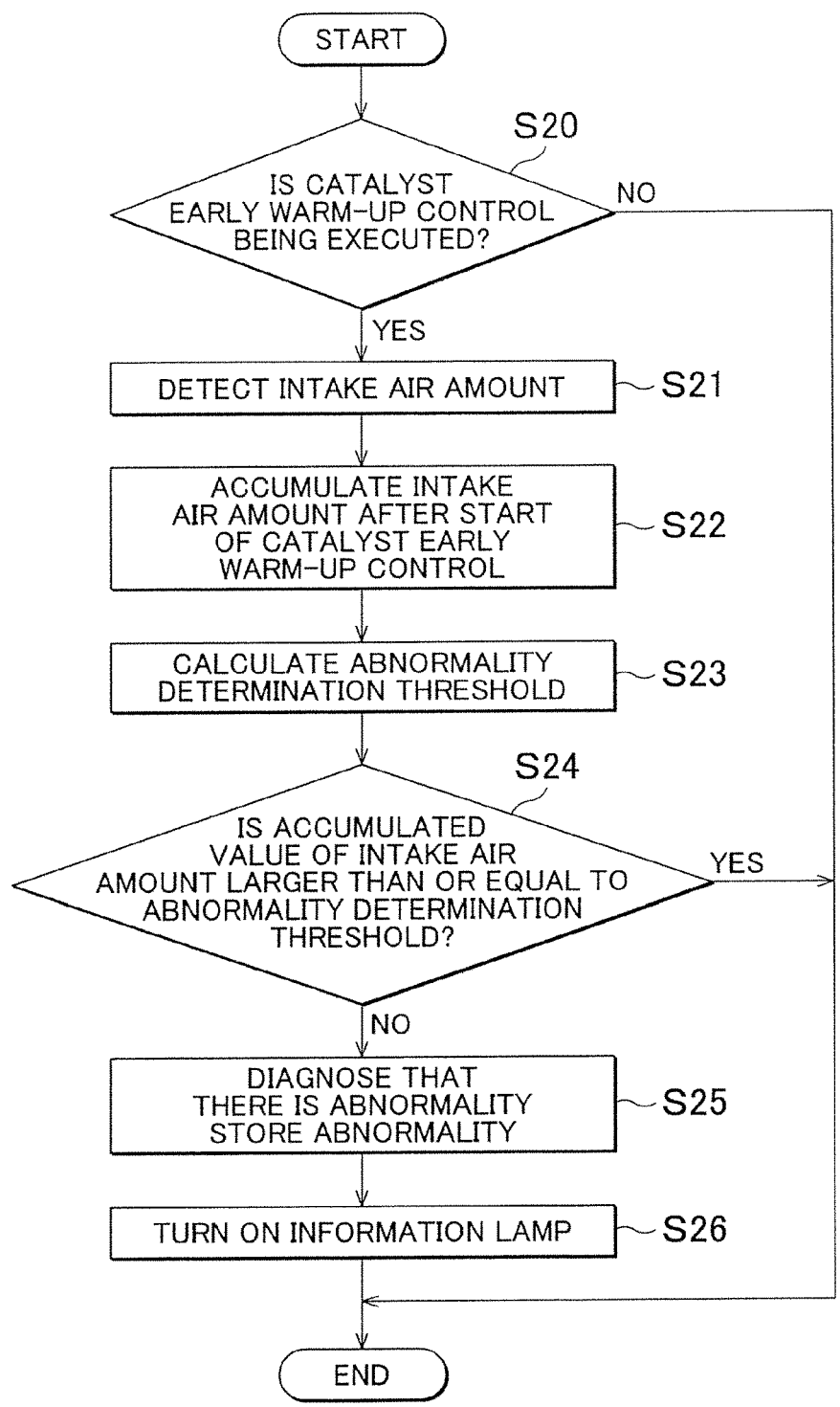
FIG. 5 is a flowchart that shows the procedure of diagnosing whether there is an abnormality according to the embodiment.

As shown in FIG. 5, when the abnormality diagnosis is started, it is initially determined in step S20 whether catalyst early warm-up control is being executed. When idle operation is being carried out while the engine is cold and it is determined that a warm-up of the catalyst has not completed, affirmative determination is made in step S20. In step S20, the controller 21 is able to determine whether the engine is cold on the basis of the detected value of the coolant temperature sensor 33. The controller 21 is able to determine whether a warm-up of the catalyst has completed on the basis of whether catalyst early warm-up control has been already executed for a predetermined period after an engine start. The predetermined period is set such that it is possible to determine that a warm-up of the catalyst has completed. When it is determined in step S20 that catalyst early warm-up control is not being executed, the controller 21 once ends the process.

On the other hand, when it is determined in step S20 that catalyst early warm-up control is being executed, the process proceeds to step S21. In step S21, the controller 21 detects the intake air amount on the basis of information input from the air flow meter 32. Subsequently, the process proceeds to step S22, and accumulates the intake air amount after catalyst early warm-up control. More specifically, by adding a currently detected intake air amount to an accumulated value of the intake air amount at the time when the process has been executed last time, an accumulated value of the intake air amount after a start of catalyst early warm-up control is calculated as an index value of the intake air amount. When it is determined in step S20 of the current process that catalyst early warm-up control is being executed for the first time after an engine start, the currently detected intake air amount is the accumulated value of the intake air amount after a start of catalyst early warm-up control.

Subsequently, the process proceeds to step S23, and the abnormality determination threshold is calculated. In step S23, the abnormality determination threshold is calculated on the basis of the abnormality determination map selected in accordance with the flowchart shown in FIG. 4. More specifically, by applying the engine coolant temperature that is detected by the coolant temperature sensor 33 to the abnormality determination map, the intake air amount required in the current routine is derived. The currently derived intake air amount is added to the previously calculated abnormality determination threshold, and the resultant accumulated value is calculated as the current abnormality determination threshold. When it is determined in step S20 of the current process that catalyst early warm-up control is being executed for the first time after an engine start, the intake air amount required in the current process is set for the abnormality determination threshold.

Subsequently, in step S24, it is determined whether the accumulated value of the intake air amount, calculated in step S22, is larger than or equal to the abnormality determination threshold calculated in step S23. When affirmative determination is made in step S24, the accumulated value of the intake air amount during catalyst early warm-up control is larger than or equal to the accumulated value of the intake air amount, required for catalyst early warm-up control, so it may be determined that there is no abnormality that the intake air amount reduces. Therefore, at this time, the controller 21 once ends the process without diagnosing an abnormality.

On the other hand, when it is determined in step S24 that the accumulated value of the intake air amount is not larger than or equal to the abnormality determination threshold, that is, the accumulated value of the intake air amount is smaller than the abnormality determination threshold, the controller 21 diagnoses an abnormality that the intake air amount reduces, and stores the abnormality diagnosis in the EEPROM of the controller 21 in step S25. The process proceeds to step S26 and the controller 21 turns on the information lamp 27 and once ends the process.

Next, the operation of the present embodiment will be described. In the present embodiment, the controller 21 determines whether there is an abnormality that the intake air amount reduces during the catalyst early warm-up control. The abnormality determination threshold for abnormality determination is changed on the basis of the mode in which the working angle of the intake valve 11 is changed by the variable mechanism 17. More specifically, the abnormality determination threshold is changed between when the variable mechanism 17 is controlling the working angle of the intake valve 11 to the minimum working angle and when the variable mechanism 17 is not controlling the working angle to the minimum working angle.

That is, in the present embodiment, during execution of catalyst early warm-up control, basically, the working angle of the intake valve 11 is controlled by the variable mechanism 17 to the minimum working angle, thus raising the exhaust gas temperature by further retarding the ignition timing without causing a misfire. When the ignition timing is retarded in this way, the intake air amount is increased by increasing the opening degree of the throttle valve 13 in order to suppress a decrease in idle rotation speed due to a decrease in torque caused by retardation of the ignition timing. On the other hand, when the working angle of the intake valve 11 is not controlled to the minimum working angle during execution of catalyst early warm-up control, the action of facilitating mixing of fuel and air by narrowing the working angle is not obtained. Therefore, in order to suppress a misfire, the ignition timing needs to be more advanced than that when the working angle is narrowed. In this case, in order to suppress a rise in idle rotation speed due to advance of the ignition timing, the intake air amount needs to be reduced by reducing the opening degree of the throttle valve 13.

In this way, the intake air amount required during catalyst early warm-up control changes on the basis of the mode in which the working angle of the intake valve 11 is changed by the variable mechanism 17. In terms of this point, in the present embodiment, in the abnormality determination map that is selected in the case where the working angle of the intake valve 11 is not controlled to the minimum working angle, the required intake air amount is set to a smaller amount than that in the map that is selected in the case where the working angle is controlled to the minimum working angle. Therefore, when the working angle of the intake valve 11 is not controlled to the minimum working angle, the abnormality determination threshold is set to a smaller value than that when the working angle is controlled to the minimum working angle. Thus, when the working angle of the intake valve 11 is not controlled to the minimum working angle, it is possible to suppress an erroneous diagnosis of an abnormality, which can occur when it is diagnosed whether there is an abnormality that the intake air amount reduces on the basis of a similar abnormality determination threshold to that when the working angle is controlled to the minimum working angle. In this way, when the working angle of the intake valve 11 is changed in the case where the internal combustion engine 1 includes the variable mechanism 17 that changes the working angle of the intake valve 11 as well, it is appropriately diagnosed whether there is an abnormality that the intake air amount reduces.

According to the present embodiment described in detail above, the following operation and advantageous effects are obtained. The intake air amount required to keep the engine rotation speed at the idle rotation speed changes on the basis of the mode in which the working angle is changed by the variable mechanism 17. In terms of this point, in the present embodiment, the abnormality determination threshold for diagnosing an abnormality is changed on the basis of the mode in which the working angle is changed by the variable mechanism 17. Therefore, when the working angle of the intake valve 11 is changed in the internal combustion engine 1 including the variable mechanism 17 that changes the working angle of the intake valve 11 as well, it is possible to diagnose an abnormality that the intake air amount reduces.

In the present embodiment, it is diagnosed as an abnormality when the accumulated value of the intake air amount is smaller than the abnormality determination threshold, and, when the working angle of the intake valve 11 is controlled by the variable mechanism 17 to the minimum working angle, the abnormality determination threshold is reduced as compared to that in the case where the working angle is controlled to a working angle larger than the minimum working angle. That is, when the working angle is narrowed, the abnormality determination threshold is reduced as compared to when the working angle is not narrowed.

When the working angle of the intake valve 11 is narrowed by the variable mechanism 17, mixing of fuel and air is facilitated as compared to when the working angle of the intake valve 11 is not narrowed by the variable mechanism 17, and a torque that is generated through combustion increases. Therefore, the intake air amount required to keep the idle rotation speed reduces. Therefore, it is possible to appropriately set the abnormality determination threshold in response to a change in the required intake air amount that increases or reduces in response to a change in the working angle. Therefore, it is possible to appropriately diagnose an abnormality that the intake air amount reduces on the basis of the working angle.

In the present embodiment, when catalyst early warm-up control is being executed, it is diagnosed whether there is an abnormality that the intake air amount reduces. When catalyst early warm-up control is being executed, the degree of retardation of the ignition timing is also changed on the basis of the working angle of the intake valve 11, set by the variable mechanism 17, so a change in the intake air amount required in order to keep the idle rotation speed is particularly remarkable. Therefore, the abnormality determination threshold is changed on the basis of the mode in which the working angle is changed when catalyst early warm-up control is being executed. Thus, it is possible to appropriately diagnose whether there is an abnormality that the intake air amount reduces.

Next, a second embodiment of a diagnostic system for an internal combustion engine will be described with reference to FIG. 6. In the present embodiment, like reference numerals denote similar components to those of the first embodiment, and the overlap description is omitted where appropriate. The components and operation, unless otherwise specified, are similar to those of the first embodiment.

In the present embodiment, the controller 21 has the function as a variable mechanism diagnosing unit, and diagnoses whether the variable mechanism 17 is operating. When there occurs an abnormality in the intake system including the variable mechanism 17, the controller 21 individually stores which one of the variable mechanism 17 and the intake system other than the variable mechanism 17 has an abnormality, and informs the abnormality by turning on the information lamp 27.

Figure 6:
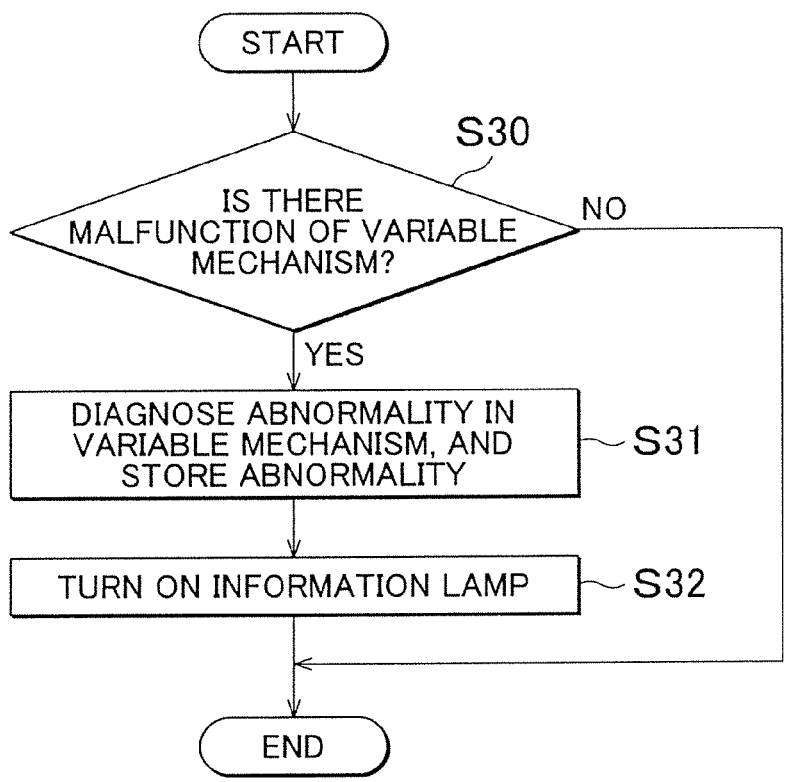
FIG. 6 is a flowchart that shows the procedure of diagnosing whether there is an abnormality in a variable mechanism according to a second embodiment.

The controller 21 diagnoses whether there is an abnormality in the variable mechanism 17 in accordance with the procedure shown in the flowchart of FIG. 6. A series of processes shown in FIG. 6 are executed as interrupt processing at predetermined intervals. As shown in FIG. 6, when the abnormality diagnosis of the variable mechanism 17 is started, it is determined in step S30 whether there is a malfunction of the variable mechanism 17. A cause of the malfunction of the variable mechanism 17 includes, for example, a break in the motor 18a that drives the control shaft 18, inclusion of foreign matter in the variable mechanism 17 or the control shaft 18, and the like. When the controller 21 outputs a signal for driving the motor 18a of the control shaft 18 and when the displacement of the control shaft 18, which is detected by the displacement sensor 35, is a value corresponding to the drive signal of the controller 21, the controller 21 determines that the control shaft 18 is normally displaced and the working angle of the intake valve 11 is appropriately changed. Thus, in such a case, negative determination is made in step S30, and the controller 21 once ends the process. On the other hand, although the controller 21 is outputting a signal for driving the motor 18a of the control shaft 18, when the displacement of the control shaft 18, detected by the displacement sensor 35, is not a value corresponding to this signal, the controller 21 determines that there is a malfunction of the variable mechanism 17. In such a case, affirmative determination is made in step S30, the process proceeds to step S31, and the diagnosis of an abnormality in the variable mechanism 17 is stored in the EEPROM of the controller 21. The process proceeds from step S31 to step S32, the information lamp 27 is turned on, and the controller 21 once ends the process.

It is diagnosed whether there is an abnormality in the intake system other than the variable mechanism 17 in the mode shown in the flowchart of FIG. 5 according to the first embodiment. In the abnormality diagnosis shown in FIG. 5, when there is no abnormality of a malfunction of the variable mechanism 17 or when no learning control is being executed, the accumulated value of the intake air amount required in the case where the working angle of the intake valve 11 is controlled to the minimum working angle is used as the abnormality determination threshold. On the other hand, when there is an abnormality of a malfunction of the variable mechanism 17 or when learning control is being executed, the accumulated value of the intake air amount in the case where the working angle of the intake valve 11 is controlled to the maximum working angle is used as the abnormality determination threshold. The abnormality determination threshold is smaller than the abnormality determination threshold in the case where the working angle of the intake valve 11 is the minimum working angle.

That is, in the abnormality diagnosing process shown in FIG. 5, the abnormality determination threshold is a value incorporating the operation state of the variable mechanism 17. Therefore, when it is diagnosed that there is an abnormality that the intake air amount reduces, it is allowed to diagnose an abnormality in the intake system other than the variable mechanism 17. Thus, in the present embodiment, in step S25 in FIG. 5, it is diagnosed that there is an abnormality in a portion of the intake system other than the variable mechanism 17. That is, it is diagnosed that there is an abnormality in a drive mechanism of the throttle valve 13, an abnormality in a detected value of the throttle sensor 30 or the air flow meter 32, or the like. The diagnosis of an abnormality in a portion of the intake system other than the variable mechanism 17 is stored in the EEPROM of the controller 21, and the information lamp 27 is turned on in step S26.

Next, the operation of the present embodiment will be described. In the present embodiment, not only when there is an abnormality in the variable mechanism 17 in the intake system but also when there is an abnormality in a portion other than the variable mechanism 17, the information lamp 27 is turned on. The EEPROM of the controller 21 individually stores whether the information lamp 27 is turned on because of an abnormality in the variable mechanism 17 or because of an abnormality in a portion of the intake system other than the variable mechanism 17. An abnormality is informed by turning on the information lamp 27, so a driver is allowed to carry the internal combustion engine 1 to a dealer, a repair shop, or the like. When information about the diagnosis stored in the EEPROM of the controller 21 is output at a dealer, a repair shop, or the like, a worker is allowed to grasp which portion has an abnormality in the intake system.

The case where it is diagnosed that there is an abnormality that the intake air amount reduces on the condition that the accumulated value of the intake air amount is smaller than the abnormality determination threshold in the case where the working angle is the minimum working angle irrespective of the operation condition of the variable mechanism 17 will be considered. In this case, although the intake air amount is actually controlled to an appropriate amount for keeping the idle rotation speed, there is a possibility that it is erroneously diagnosed that there is an abnormality. In this case, if merely an abnormality in the intake system is stored in the controller 21 as a cause of a diagnosis of the abnormality, a worker needs to check the entire intake system on the basis of the information, and unnecessary check is carried out. In terms of this point, in the present embodiment, the controller 21 individually stores an abnormality in the variable mechanism 17 and an abnormality in a portion of the intake system other than the variable mechanism 17, so the worker is allowed to grasp an abnormal portion in details. Thus, unnecessary check is suppressed.

In the present embodiment described above in detail, the advantageous effects of the first embodiment and the following advantageous effect are obtained. In the present embodiment, the controller 21 diagnoses whether the variable mechanism 17 is operating, and when the controller 21 has diagnosed an abnormality that the intake air amount reduces while the variable mechanism 17 is not operating, outputs the diagnosis of the abnormality in the intake system other than the variable mechanism 17. While the variable mechanism 17 is not operating, it is diagnosed whether there is an abnormality that the intake air amount reduces by using the abnormality determination threshold for the case where the working angle is not changed by the variable mechanism 17. That is, the diagnosis in this case is made previously in consideration of the fact that the variable mechanism 17 is not operating. When it has been diagnosed that there is an abnormality that the intake air amount reduces through this diagnosis, another factor is occurring in addition to the fact that the variable mechanism 17 is not operating. Thus, it is possible to diagnose an abnormality in the intake system other than the variable mechanism 17.

The diagnostic system for an internal combustion engine is not limited to the configurations illustrated in the above-described embodiments. The diagnostic system may be, for example, implemented as the following embodiment modified as needed from the configurations illustrated in the above-described embodiments.

In the above-described embodiments, the process of selecting the abnormality determination map for setting the abnormality determination threshold, shown in FIG. 4, is executed when catalyst early warm-up control is started. Even when the working angle of the intake valve is controlled by the variable mechanism to the minimum working angle at a start of catalyst early warm-up control, the working angle of the intake valve may not be able to be controlled to the minimum working angle because of a request to execute learning control in the middle of catalyst early warm-up control, an abnormality of the variable mechanism, or the like. In addition, the shift range may be changed during catalyst early warm-up control. Thus, the process shown in FIG. 4 may be executed at predetermined processing intervals during catalyst early warm-up control and then the abnormality determination map suitable for the current operation condition of the variable mechanism and the shift range may be selected each time. Then, the abnormality determination threshold may be calculated by deriving the required intake air amount on the basis of the abnormality determination map selected each time and accumulating the derived intake air amount.

In the above-described embodiments, the abnormality determination threshold is derived by accumulating the intake air amount required per unit time, which is set on the basis of the coolant temperature at a start of execution of catalyst early warm-up control. A mode in which the abnormality determination threshold is set is not specifically limited. For example, the abnormality determination threshold based on the operation state of the variable mechanism may be used irrespective of the coolant temperature at a start of execution of catalyst early warm-up control.

In the above-described embodiments, when it is required to execute learning control for learning the absolute position of the control shaft, learning control for learning the absolute position of the control shaft is executed even during catalyst early warm-up control. Learning control may be prohibited during catalyst early warm-up control. In the above-described embodiments, learning control is executed by displacing the control shaft to the high end side. Instead, learning control may be configured such that the control shaft is displaced toward the low end side and then a value at the time when the control shaft contacts the low end-side stopper is stored in the EEPROM as the initial value. When it is required to execute learning control during catalyst early warm-up control, the control shaft may be brought into contact with the low end-side stopper and keep the state where the control shaft contacts the low end-side stopper until the end of catalyst early warm-up control. In this case, it is possible to control the working angle of the intake valve to the minimum working angle during catalyst early warm-up control.

In the above-described embodiments, the abnormality determination threshold is changed between when the working angle of the intake valve is the minimum working angle during catalyst early warm-up control and when the working angle is larger than the minimum working angle during catalyst early warm-up control. When the working angle of the intake valve is larger than the minimum working angle, the abnormality determination threshold is calculated by accumulating the required intake air amount in the case where the working angle of the intake valve is the maximum working angle irrespective of the amount of the working angle. As the working angle of the intake valve is narrowed, mixing of fuel and air is facilitated, and combustion takes place in a desired manner. Therefore, a torque that is generated through the combustion increases, and the intake air amount required to keep the idle rotation speed reduces. Thus, the required intake air amount reduces as the working angle is narrowed. Therefore, as the working angle of the intake valve is narrowed, the abnormality determination threshold may be set to a larger value. Thus, it is possible to appropriately set the abnormality determination threshold in association with a change in the required intake air amount that increases or reduces in response to a change in the amount of the working angle. Therefore, it is possible to appropriately diagnose an abnormality that the intake air amount reduces on the basis of the amount of the working angle.

In the above-described embodiments, during catalyst early warm-up control, the abnormality determination threshold is set to a larger value when the shift range is the neutral range than when the shift range is the drive range. For example, the idle rotation speed may be set so as to be lower during idle operation of the drive range than that during idle operation of the neutral range for the purpose of, for example, suppressing creep running. In such a case, the required intake air amount may be larger when the shift range is the neutral range than when the shift range is the drive range. Thus, in this case (when the idle rotation speed is set so as to be lower during idle operation of the drive range than that during idle operation of the neutral range), the abnormality determination threshold may be set to a smaller value in the case of the neutral range than in the case of the drive range. In an internal combustion engine in which the required intake air amount is the same between the drive range and the neutral range, the abnormality determination threshold may be set to the same value both in the case of the drive range and in the case of the neutral range.

In the above-described embodiments, during catalyst early warm-up control, basically, the working angle of the intake valve is controlled to the minimum working angle. The working angle that is controlled during catalyst early warm-up control is not limited to the minimum working angle. The working angle of the intake valve may be controlled to a small working angle other than the minimum working angle.

In the above-described embodiments, it is determined that a warm-up of the catalyst has completed on the basis of the fact that catalyst early warm-up control has been executed for the predetermined period. Instead, a temperature sensor for detecting the temperature of the exhaust gas purification catalyst may be provided, for example, near the exhaust gas purification catalyst in the exhaust passage, and it may be determined whether a warm-up of the exhaust gas purification catalyst has completed on the basis of a detected value of the temperature sensor.

In the second embodiment, when it is determined that there is a malfunction of the variable mechanism, the diagnosis of an abnormality in the variable mechanism is stored in the EEPROM of the controller, and the information lamp is turned on. Even when there temporarily occurs inclusion, or the like, of foreign matter in the variable mechanism or the control shaft, the foreign matter may be removed through driving of the motor by the controller and then the variable mechanism may be operable. Therefore, only when it is determined multiple times that there is a malfunction in the variable mechanism, the controller may determine that there is an abnormality in the variable mechanism, store the abnormality and cause the information lamp to turn on.

In the above-described embodiments, the working angle of the intake valve is continuously changeable between the maximum working angle and the minimum working angle. The working angle is not limited to the one that is continuously changeable, and may be, for example, changeable only to any one of the maximum working angle and the minimum working angle.

In the above-described embodiments, the controller acquires the working angle of the intake valve by detecting the absolute position of the control shaft of the variable mechanism. Instead, a working angle sensor that directly detects the working angle of the intake valve may be provided, and the controller may acquire the working angle of the intake valve on the basis of the detected result.

In the above-described embodiments, the working angle of the intake valve is changed by displacing the control shaft, connected to the variable mechanism, with the driving force of the motor. The variable mechanism is not limited to the one that changes the working angle of the intake valve by displacing the control shaft in the axial direction, and a specific mode, power, and the like, of the variable mechanism are not specifically limited.

In the above-described embodiments, during catalyst early warm-up control, it is diagnosed whether there is an abnormality that the intake air amount reduces. During another engine operation, for example, during idle operation after a warm-up of the catalyst, it may be diagnosed whether there is an abnormality that the intake air amount reduces.

In the above-described embodiments, an accumulated value of the intake air amount is calculated as the index value of the intake air amount, and, when the accumulated value of the intake air amount is smaller than the abnormality determination threshold, it is diagnosed that there is an abnormality that the intake air amount reduces. Instead, the intake air amount detected by the air flow meter 32 may be directly used as the index value of the intake air amount, and, when the intake air amount is smaller than an abnormality determination threshold, it may be diagnosed that there is an abnormality.

What is claimed is:

1. A diagnostic system for an internal combustion engine including a variable mechanism that changes a working angle of an intake valve, the diagnostic system comprising:
   a controller configured to:
   (i) attempt to control the working angle of the intake valve to be a first working angle;
   (ii) determine whether the working angle of the intake valve is controlled to be the first working angle;
   (iii) in response to determining that the working angle of the intake valve is controlled to be the first working angle, set an abnormality determination threshold to a first abnormality determination threshold;
   (iv) in response to determining that the working angle of the intake valve is not controlled to be the first working angle, set the abnormality determination threshold to a second abnormality determination threshold, wherein the first abnormality determination threshold is different than the second abnormality determination threshold;

(v) diagnose an abnormality that an intake air amount reduces, when an index value of the intake air amount becomes smaller than the abnormality determination threshold during idle operation; and (vi) turn on an information lamp in response to diagnosing the abnormality that the intake air amount reduces.

2. The diagnostic system according to claim 1, wherein the controller is configured to diagnose the abnormality that the intake air amount reduces, when an accumulated value of the intake air amount is smaller than the abnormality determination threshold.

3. The diagnostic system according to claim 2, wherein the controller is configured to reduce the abnormality determination threshold when the working angle of the intake valve is narrowed by the variable mechanism as compared to when the working angle is not narrowed.

4. The diagnostic system according to claim 2, wherein the controller is configured to reduce the abnormality determination threshold as the working angle of the intake valve is narrowed by the variable mechanism.

5. The diagnostic system according to claim 1, wherein the controller is configured to diagnose whether there is the abnormality that the intake air amount reduces, when catalyst early warm-up control for retarding ignition timing and controlling an opening degree of a throttle valve such that an idle rotation speed is kept is being executed.

6. The diagnostic system according to claim 1, wherein the controller is configured to diagnose whether the variable mechanism is operating, and the controller is configured to output a diagnosis of an abnormality in an intake system other than the variable mechanism, when the controller has diagnosed an abnormality that the intake air amount reduces while the variable mechanism is not operating.

7. A diagnostic method for an internal combustion engine including a controller and a variable mechanism that changes a working angle of an intake valve, the diagnostic method comprising:

attempting, by the controller, to control the working angle of the intake valve to be a first working angle;

determining, by the controller, whether the working angle of the intake valve is controlled to be the first working angle;

in response to determining that the working angle of the intake valve is controlled to be the first working angle, setting, by the controller, an abnormality determination threshold to a first abnormality determination threshold;

in response to determining that the working angle of the intake valve is not controlled to be the first working angle, setting, by the controller, the abnormality determination threshold to a second abnormality determination threshold, wherein the first abnormality determination threshold is different than the second abnormality determination threshold;

diagnosing, by the controller, an abnormality that an intake air amount reduces when an index value of the intake air amount becomes smaller than the abnormality determination threshold during idle operation; and turning on an information lamp in response to diagnosing the abnormality that the intake air amount reduces.

8. An electronic control unit for diagnosing an abnormality of an intake air amount, the electronic control unit comprising a processor and a non-transitory memory module, wherein the non-transitory memory module comprises a set of machine readable instructions that, when executed by the processor:

attempt to control a working angle of an intake valve of an internal combustion engine to be a first working angle;

determine the working angle of the intake valve of the internal combustion engine;

calculate an index value of the intake air amount;

determine whether the working angle of the intake valve is controlled to be the first working angle;

in response to determining that the working angle of the intake valve is controlled to be the first working angle, set an abnormality determination threshold to a first abnormality determination threshold when the working angle is the first working angle;

in response to determining that the working angle of the intake valve is not controlled to be the first working angle, set the abnormality determination threshold to a second abnormality determination threshold when the working angle is a second working angle, wherein the second working angle is greater than the first working angle, and wherein the first abnormality determination threshold is different than the second abnormality determination threshold;

diagnose the abnormality of the intake air amount when the index value of the intake air amount is smaller than the abnormality determination threshold; and turn on an information lamp in response to diagnosing the abnormality of the intake air amount.

9. An apparatus comprising:

the intake valve;

a variable mechanism for changing the working angle of the intake valve;

a control shaft connected to the variable mechanism;

a motor connected to the control shaft and for driving the control shaft and the variable mechanism in an axial direction;

a displacement sensor that outputs a displacement sensor output signal indicative of the position of the control shaft;

an air flow meter that outputs an air flow meter output signal indicative of an amount of air that passes through an intake passage of the internal combustion engine; and the electronic control unit of claim 8, wherein:

the working angle of the intake valve is determined based on the displacement sensor output signal; and the index value of the intake air amount is calculated based on the air flow meter output signal.

10. The electronic control unit of claim 8, wherein the first abnormality determination threshold is a larger abnormality determination threshold, wherein the second abnormality determination threshold is a smaller abnormality determination threshold, and wherein the larger abnormality determination threshold is greater than the smaller abnormality determination threshold.

11. The electronic control unit of claim 10, wherein the set of machine readable instructions, when executed by the processor:

set an opening degree of a throttle valve of the internal combustion engine to a smaller opening angle when the working angle is the second working angle; and set the opening degree of the throttle valve of the internal combustion engine to a larger opening angle when the working angle is the first working angle, wherein the larger opening degree is greater than the smaller opening degree.

12. The electronic control unit of claim 10, wherein the set of machine readable instructions, when executed by the processor:
retard an ignition timing when the working angle is the first working angle relative to when the working angle is the second working angle.

13. The electronic control unit of claim 10, wherein the set of machine readable instructions, when executed by the processor:
advance an ignition timing when the working angle is the second working angle relative to when the working angle is the first working angle.

14. The diagnostic system according to claim 1, wherein the first working angle is a minimum working angle.

15. The diagnostic method of claim 7, wherein the first working angle is a minimum working angle.

16. The electronic control unit of claim 8, wherein the first working angle is a minimum working angle.

\* \* \* \* \*